United States Patent

[11] 3,619,224

[72] Inventors Wataru Inamoto
Sakai-shi;
Seizo Kuroki, Osaka-shi; Kohtaro Tottori,
Sakai-shi; Osamu Nagasawa, Sakai-shi, all
of Japan; Sakai Chemical Industry
Company Limited, Sakai-shi, Osaka-fu,
Japan
[21] Appl. No. 843,756
[22] Filed July 22, 1969
[45] Patented Nov. 9, 1971
[32] Priority July 24, 1968
[33] Japan
[31] 43/52707

[54] HOT MELT ROAD-MARKING COMPOSITIONS
9 Claims, No Drawings

[52] U.S. Cl. .................................. 106/240,
260/32.4, 260/37, 260/41
[51] Int. Cl. .................................... C08h 17/44
[50] Field of Search ........................... 260/326,
32.4; 106/240, 176

[56] References Cited
UNITED STATES PATENTS
3,497,369 2/1970 Martin .................... 106/153
2,487,105 11/1949 Cornwell ................. 260/326
2,452,315 10/1948 Morgan et al. ........... 200/326

Primary Examiner—Morris Liebman
Assistant Examiner—T. Morris
Attorney—Larson, Taylor and Hinds ABSTRACT: A hot melt road-marking composition which comprises 15 to 40 weight percent of a thermoplastic binder resin having a softening point of 50° to 160° C., 10 to 30 weight percent of at least one species of phthalimide derivatives having the structural formula of

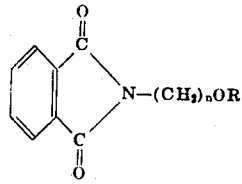

wherein R is hydrogen, $CH_3CO-$,

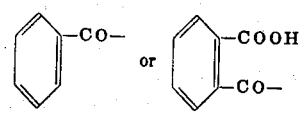

and $n$ is an integer of 1 or 2, and 30 to 75 weight percent of filler and pigment; said phthalimide derivative having a melting point of 90° to 120° C. and capable of dissolving said thermoplastic resin binder therein when fused but having substantially no compatibility with the resin binder at a room temperature.

HOT MELT ROAD-MARKING COMPOSITIONS

This invention relates to a novel and useful road-marking composition, particularly to a hot melt road-marking composition used in a melted state and suitable for marking traffic lines on road, airfield runways and like surfaces.

The road-marking compositions are roughly divided into two types of compositions, the hot melt composition almost free of solvents for binder resins and the paint-type composition in which binder resins are dissolved in solvents. The hot melt composition mainly consists of a thermoplastic resin binder, filler and pigment, and is applied after being heated to fuse the composition. The road-marking composition of this kind is good in its quick-hardening property and the durability of the film obtained therefrom, but on the other hand, when applying this composition after heated the extremely high melt viscosity thereof is a serious handicap as prohibiting spray coating. Accordingly, in applying such a composition to the road surface, the composition has to be applied by pouring it through slits of coating machines, which is extremely inefficient. And in this way of coating some primer composition should be used when the road surface is rugged. To reduce the melt viscosity of the composition by heating to a sprayable degree a temperature of more than 200° C. is required, necessitating expensive equipment durable to such high temperature and resulting in poor adhesion with the surface coated therewith since the temperature applied is too high. In the paint-type composition the viscosity thereof is low and suitable for spray coating, however, for the presence of the solvent a long drying time is required and when such composition is applied onto an asphalt road the asphalt is deteriorated by the solvent. For example, even a film about 0.3 mm. thick requires at least 30 minutes for drying to evaporate the solvent, and it is practically almost impossible to obtain a film X 1 mm. thick for the reason of prolonged drying time. This composition is thus handicapped by the insufficient thickness of the film and poor durability.

One object of the invention is accordingly to provide a road-marking composition whereby the aforementioned drawbacks of the conventional compositions can be overcome.

Another object of the invention is to provide a hot melt road-marking composition which displays a low melt viscosity at low temperature, making it possible to effect spray-coating by air spray or airless spray method.

A further object of the invention is to provide a hot melt road-marking composition capable of producing a coated film strongly adhered to road surface without using primer irrespective of the conditions of the road surface.

A still further object of the invention is to provide a hot melt road-marking composition which is exceptionally quick-hardening.

A still another object of the invention is to provide a hot melt road-marking composition from which durable coating film having various desired thickness varying from 0.1 mm. to 1.5 mm. thickness can be advantageously obtained with quick-hardening These and other objects of the invention will become apparent from the following detailed description:

The present hot melt composition comprises 15 to 40 weight percent of a thermoplastic resin binder, 10 to 30 weight percent of at least one species of phthalimide derivatives having the structural formula of

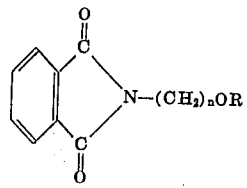

wherein R is hydrogen, $CH_3CO-$,

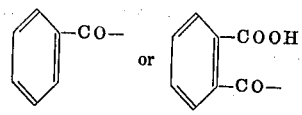

and $n$ is an integer of 1 or 2, and 30 to 75 weight percent of filler and pigment; said phthalimide derivative having a melting point of 90 to 120° C. and being capable of dissolving said thermoplastic resin binder therein when melted but having substantially no compatibility with the resin binder at a room temperature.

Throughout the specification and claims the expression "-having no compatibility with binder resin" used in reference to phthalimide derivatives means that when the present composition containing the phthalimide derivative in a range of 10 to 30 weight percent is applied onto a road surface in a melted state and then cooled the phthalimide derivative is crystallized and deposited to produce an opaque film on the road surface.

According to the present invention when the hot melt composition of the invention is heated for coating the phthalimide derivatives are fused to dissolve therein the binder resin melted or nonmelted by heat, so that the melted composition displays low melt viscosity at a temperature of not higher than 200° C., thus making it possible to effect spray coating which renders the coating procedure efficient. When he composition is applied onto the road surface the phthalimide derivative having substantially no compatibility with the binder resin is first deposited by crystallization thereof and then the binder resin is solidified quickly by being cooled to produce an opaque coating film strongly adhered to the road surface. This hardening property by far excels that of the conventional hot melt road-marking compositions, and the phthalimide derivative crystallized serves as a filler in the resultant film without adversely affecting the properties of the film. Further, this quick-hardening property of the present composition makes it possible to produce a coating film having various thickness varying from 0.1 mm. to 1.5 mm. in a short period of coating procedure by only one application of spraying. As the phthalimide derivative has substantially no compatibility with the binder resin, the addition thereof does not reduce the softening point of the composition and the film obtained therefrom has a sufficiently high softening point, so that no deformation of the film occurs even when the temperature of the road surface rises in summer season.

The present composition usually displays a melt viscosity of lower than 1,000 cps. when heated at a temperature higher than 120° C. but less than 200° C. and can easily be coated on the road surface by spray coating, and when heated at a temperature of 160 to 200° C. it shows a melt viscosity as low as less than 500 cps., making air spray as well as airless spray coating possible. By spray coating the atomized composition is blasted onto the road surface to give a film strongly adhered to the surface without application of primer coating. The spray composition is generally hardened within 90 seconds to produce a film on the road surface.

Throughout the specification melt viscosity is measured by Brookfield viscometer, hardening property is determined in accordance with ASTM-D 711, and softening point is measured in accordance with JIS-K 5902.

The phthalimide derivatives used in the invention should have a melting point of 90 to 120° C. and also have a property to dissolve therein the binder resin used when it is melted. But such derivatives have substantially no compatibility with binder resin used at room temperatures, because if they have good compatibility with binder resin at room temperature prolonged period of time is required for hardening the coated film and the softening point of the resultant film decreases to such a degree as it is deformed on the road surface in summer season. Every phthalimide derivative having the structural formula disclosed before can be used as far as it has the above properties. The preferable derivatives are phthalimido methyl alcohol

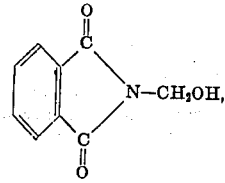

phthalimido ethyl alcohol

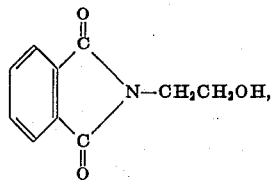

phthalimidoethyl acetate

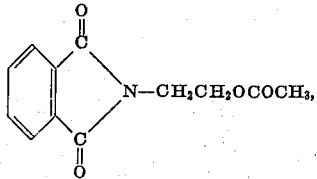

phthalimidoethyl benzoate

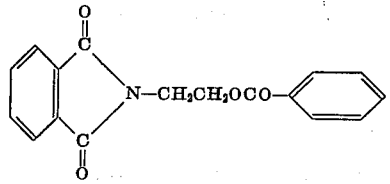

phthalimidoethyl phthalate

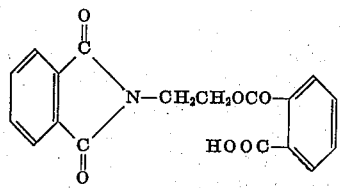

, etc. Of these derivatives, phthalimido ethyl alcohol is most preferable in the invention. The phthalimide derivatives can be effectively used alone or in mixture of more than 2 species. These phthalimide derivatives are known in the art and can be prepared by various known methods. For example, phthalimido methyl alcohol is prepared by reacting phthalimide with formaldehyde, and phthalimido ethyl alcohol is obtainable by the dehydration reaction of phthalic anhydride with ethanol amine, and esters of such phthalimide alcohols can be produced by the esterification of such alcohols with carboxylic acids.

To binder resins employed in the invention are thermoplastic resins having a softening point of 50 to 160° C., preferably 50 to 130° C., and include various resins heretofore used as a binder for hot melt road-marking composition. Examples of the resins are terpene resin, petroleum resin, polyester resin, rosin gum, maleic acid resin, alkyd resin, etc.

These resins can be used singly or in mixture with one another with or without plasticizers. Examples of plasticizers are dibutyl phthalate, dioctyl phthalate, seed oil, soy bean oil, mineral oil, oily polyterpene, oily petroleum resin, etc., and may be used, as required, in the amount of 4 to 20 weight percent, based on the weight of the binder resin used.

As the filler and pigment such conventional materials can be used as quartz powder, siliceous sand, and the like aggregate; calcium carbonate, barium carbonate, talc, and the like extender; and various coloring pigments such as titanium dioxide, zinc oxide, lithophone, litharge, red iron oxide, ultramarine cadmium sulfide, phthalocyanine blue, etc.

The hot melt road-marking composition of the invention contains the above components in the proportion shown below:

TABLE 1

| | Maximal composition ratio in weight percent | Optimal composition ratio in X weight percent |
|---|---|---|
| Binder resin | 15–40 | 2–27 |
| Phthalimide derivative | 10–30 | 15–25 |
| Filler and Pigment | 3–75 | 40–60 |

The hot melt road-marking composition of the invention can be used by spray method, but the conventional method of such as pouring it through the slits may also be applicable. The hot melt road-marking composition of the invention may be used by inlaying glass beads and the like immediately after the application of the composition for the purpose of reflecting the head light rays of the automobiles. When the composition is applied by air spray or by pouring it through the slits glass beads can be added to the composition before the application in the amount of 10 to 25 weight percent, based on the weight of the composition of the invention.

For better understanding of the invention examples are given below:

Example 1
Composition-(A)

| | parts by weight |
|---|---|
| Phthalimido methyl alcohol | 20 |
| Solid terpene resin | 25 |
| Plasticizer (oily polyterpene) | 3 |
| Titanium dioxide | 15 |
| Zinc oxide | 2 |
| Chalk | 15 |
| Quartz powder | 20 |

Note: Solid terpene resin used had following properties:
Acid value: 0.1, Softening point: 115° C.,
Melt viscosity: 750 cps. (at 200° C.)

The above materials except the plasticizer were pulverized with a ball mill and then mixed with the plasticizer to form a road-marking composition-(A). The softening point of the resultant composition-(A) is 118° C.

The melt viscosity at 130 to 200° C. of this composition is shown in table 2 below, in which is also shown for comparative purpose the melt viscosity at the same temperatures of the comparative composition-(a) prepared in the same manner as above from the materials shown below.

Composition-(a)

| | parts by weight |
|---|---|
| Solid terpene resin same as above | 25 |
| Plasticizer (oily polyterpene) | 5 |
| Titanium dioxide | 15 |
| Zinc oxide | 2 |
| Chalk | 33 |
| Quartz powder | 20 |

The softening point of the composition-(b) was 85° C.

TABLE 2

| Temperature (°C.) | Melt viscosity (cps.) Composition-(A) | Composition-(a) |
|---|---|---|
| 130 | 1000 | |
| 140 | 3000 | |
| 150 | 750 | |
| 160 | 500 | 21000 |
| 170 | 400 | 7500 |
| 180 | 300 | 4000 |
| 190 | 270 | 2900 |
| 200 | 250 | 2300 |

This composition-(A) was fused at 170° C. and sprayed onto road surface of a temperature of 25° C. into various film thickness. Immediately after spraying glass beads having an average granular size of 0.4 mm. is sprayed onto the sprayed film of the composition-(A) at a pressure of 80 kg./cm.² in a proportion of one-third by weight of the composition-(A) used, and the time required for hardening is shown as hardening property in table 3 below:

TABLE 3

| Film Thickness (mm.) | Hardening property (sec.) |
|---|---|
| 0.3 | 10 |
| 0.5 | 22 |
| 0.8 | 45 |
| 1.2 | 75 |

Example 2

| | Parts by weight | |
|---|---|---|
| | Compsoition-(B) | Comparative Composition-(b) |
| Phthalimido ethyl alcohol | 20 | 0 |
| Maleic acid resin | 20 | 23 |
| Plasticizer (Dibutyl phthalate) | 3 | 3 |
| Titanium dioxide | 15 | 15 |
| Zinc oxide | 2 | 2 |
| Chalk | 15 | 22 |
| Quartz powder | 20 | 30 |

Note: Maleic acid resin used had following properties:
Acid value: 22, Softening point: 95° C., Melt viscosity: 120 cps. (at 200° C.)

The above compositions-(B) and (b) were respectively prepared from the above components in the same manner as in example 1. Softening point of the compositions-(B) and (b) were 118° C., and 92° C. respectively. Melt viscosity of the respective compositions was as follows:

TABLE 4

| Temperature (°C.) | Composition-(B) | Composition-(b) |
|---|---|---|
| 130 | 1800 | |
| 140 | 600 | |
| 150 | 400 | 15000 |
| 160 | 300 | 7000 |
| 170 | 250 | 4000 |
| 180 | 230 | 2800 |
| 190 | 220 | 2000 |
| 200 | 200 | 1500 |

The composition-(B) was melted at 150° C. and sprayed onto road surface into various film thickness followed by the application of glass beads in the same manner as in example 1, and the hardening property thereof was as follows:

TABLE 5

| Film Thickness (mm.) | Hardening property (sec.) |
|---|---|
| 0.2 | 8 |
| 0.4 | 20 |
| 0.6 | 35 |
| 1.0 | 60 |

Example 3

| | Parts by weight | |
|---|---|---|
| | Composition-(C) | Comparative composition-(c) |
| Phthalimidoethyl benzoate | 30 | 0 |
| Solid terpene resin same as in Example 1 | 25 | 25 |
| Plasticizer (oily polyterpene) | 5 | 5 |
| Titanium dioxide | 15 | 15 |
| Zinc oxide | 2 | 2 |
| Chalk | 13 | 33 |
| Quartz powder | 10 | 20 |

The above compositions-(C) and (c) were respectively prepared from the above components in the same manner as in example 1. The softening point of the compositions-(C) and (c) were 105° C. and 85° C. respectively.

Melt viscosity of the respective compositions was as follows:

TABLE 6

| Temperature | Composition-(C) | Composition-(c) |
|---|---|---|
| 120 | 4000 | |
| 130 | 700 | |
| 140 | 480 | |
| 150 | 300 | 21000 |
| 160 | 230 | 12000 |
| 170 | 200 | 7500 |
| 180 | 160 | 4000 |
| 200 | 120 | 2300 |

The composition-(C) was melted at 150° C. and sprayed onto road surface into various film thickness followed by the application of glass beads in he same manner as in example 1, and the hardening property thereof was shown below.

TABLE 7

| Film Thickness (mm.) | Hardening property (sec.) |
|---|---|
| 0.2 | 15 |
| 0.4 | 32 |
| 0.8 | 56 |
| 1.2 | 85 |

Example 4

| | Parts by weight | |
|---|---|---|
| | Composition-(D) | Comparative Composition-(d) |
| Phthalimidoethyl alcohol | 17 | 0 |
| Phthalimidoethyl phthalate | 6 | 0 |
| Maleic acid resin | 25 | 25 |
| Plasticizer (Dibutyl phthalate) | 0 | 3 |
| Titanium dioxide | 15 | 15 |
| Zinc oxide | 2 | 2 |
| Chalk | 15 | 22 |
| Quartz powder | 20 | 33 |

NOte: Maleic acid resin used had following properties:
Acid Value: 28, Softening point: 97° C., Melt viscosity: 170 cps. (at 200° C.)

The above compositions-(D) and (d) were respectively prepared from the above components in the same manner as in example 1. The softening point of the compositions-(D) and -(d) were 98° C. and 95° C. respectively.

Melt viscosity of the respective compositions was as follows:

TABLE 8

| Temperature | Composition-(D) | Composition-(d) |
|---|---|---|
| 110 | 2600 | |
| 120 | 1000 | |
| 130 | 500 | 17000 |
| 140 | 330 | 9000 |
| 150 | 260 | 6000 |
| 160 | 230 | 4200 |
| 170 | 200 | 3100 |
| 180 | 180 | 2300 |
| 200 | 160 | 1300 |

The composition-(D) was melted at 140° C. and sprayed onto road surface into various film thickness followed by the application of glass beads in the same manner as in example 1, and the hardening property was shown below:

TABLE 9

| Film Thickness (mm.) | Hardening property (sec.) |
|---|---|
| 0.2 | 5 |
| 0.4 | 7 |
| 0.6 | 10 |
| 0.8 | 15 |
| 1.2 | 18 |

Example 5

| | Parts by weight | |
|---|---|---|
| | Composition-(E) | Comparative composition-(e) |
| Phthalimido ethyl alcohol | 12 | 0 |
| Phthalimido methyl alcohol | 15 | 0 |
| Plyester resin | | 20 |
| Plasticizer (Oily polyterpene resin) | 3 | 5 |
| Yellow pigment (Cadmium yellow) | 2 | 2 |
| Chalk | 43 | 43 |
| Quartz powder | 20 | 28 |

Note: Polyester resin used had following properties:
Acid value: 20, Softening point: 120° C., Melt viscosity: 1300 cps. (at 200° C.)

The above compositions-(E) and (e) were respectively prepared from the above components in the same manner as in example 1. The softening point of the compositions-(E) and (e) were 108° C. and 92° C., respectively.

Melt viscosity of the respective compositions was as follows:

TABLE 10

| Temperature | Composition | Composition-(e) |
|---|---|---|
| 110 | 7000 | |
| 120 | 3000 | |
| 130 | 1500 | |
| 140 | 690 | 20000 |
| 150 | 400 | 9400 |
| 160 | 300 | 5000 |
| 170 | 280 | 3400 |
| 180 | 240 | 2600 |
| 200 | 150 | 1800 |

The composition-(E) was melted at 150° C. and sprayed onto road surface into various film thickness followed by the application of glass beads in the same manner as in example 1, and the hardening property thereof was as follows:

TABLE 11

| Film Thickness (mm.) | Hardening property (sec.) |
|---|---|
| 0.2 | 15 |
| 0.4 | 30 |
| 0.6 | 50 |
| 0.8 | 80 |
| 1.2 | 120 |

What we claim is:

1. A hot melt road-marking composition consisting essentially of 15 to 40 weight percent of a thermoplastic binder resin selected from the group consisting of terpene resin and maleic acid resin having a softening point of 50 to 160° C, 10 to 30 weight percent of at least one species of phthalimide derivatives having the structural formula of

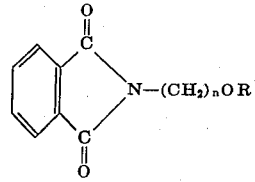

wherein R is hydrogen, $CH_3CO-$,

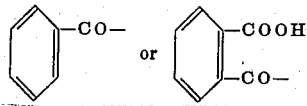

and is an integer of 1 or 2, and 30 to 75 weight percent of inorganic filler and pigment; said phthalimide derivative having a melting point of 90 to 120° C. and capable of dissolving said thermoplastic resin binder therein when fused but having substantially no compatibility with the resin binder at a room temperature.

2. The hot melt road-marking composition according to claim 1, in which said phthalimide derivative is at least one species selected from the group consisting of phthalimido methyl alcohol, phthalimido ethyl alcohol, phthalimidoethyl acetate, phthalimidoethyl benzoate and phthalimidoethyl phthalate.

3. The hot melt road-marking composition according to claim 2, in which said phthalimide derivative is phthalimido ethyl alcohol.

4. The hot melt road-marking composition according to claim 1, in which said phthalimide derivative is contained in the proportion of 20 to 27 weight percent.

5. The hot melt road-marking composition according to claim 1, in which said binder resin is terpene resin.

6. The hot melt road-marking composition according to claim 1, in which said binder resin has a softening point of 50 to 130° C.

7. The hot melt road-marking composition according to claim 1, in which said binder resin is contained in the proportion of 40 to 60 weight percent.

8. The hot melt road-marking composition according to claim 1, in which said binder resin is maleic acid resin.

9. A method for marking road surface which comprises heating the composition of claim I at 120 to 200° C. to obtain a fused composition having a melt viscosity of lower than 1000 cps., spraying the fused composition onto a road surface and allowing the composition to be hardened.

* * * * *